Figure 8:
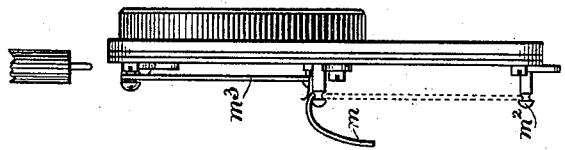

(No Model.) 3 Sheets—Sheet 1.
G. G. ROCKWOOD & H. B. SHALLENBERGER.
PANORAMIC CAMERA.
No. 441,704. Patented Dec. 2, 1890.
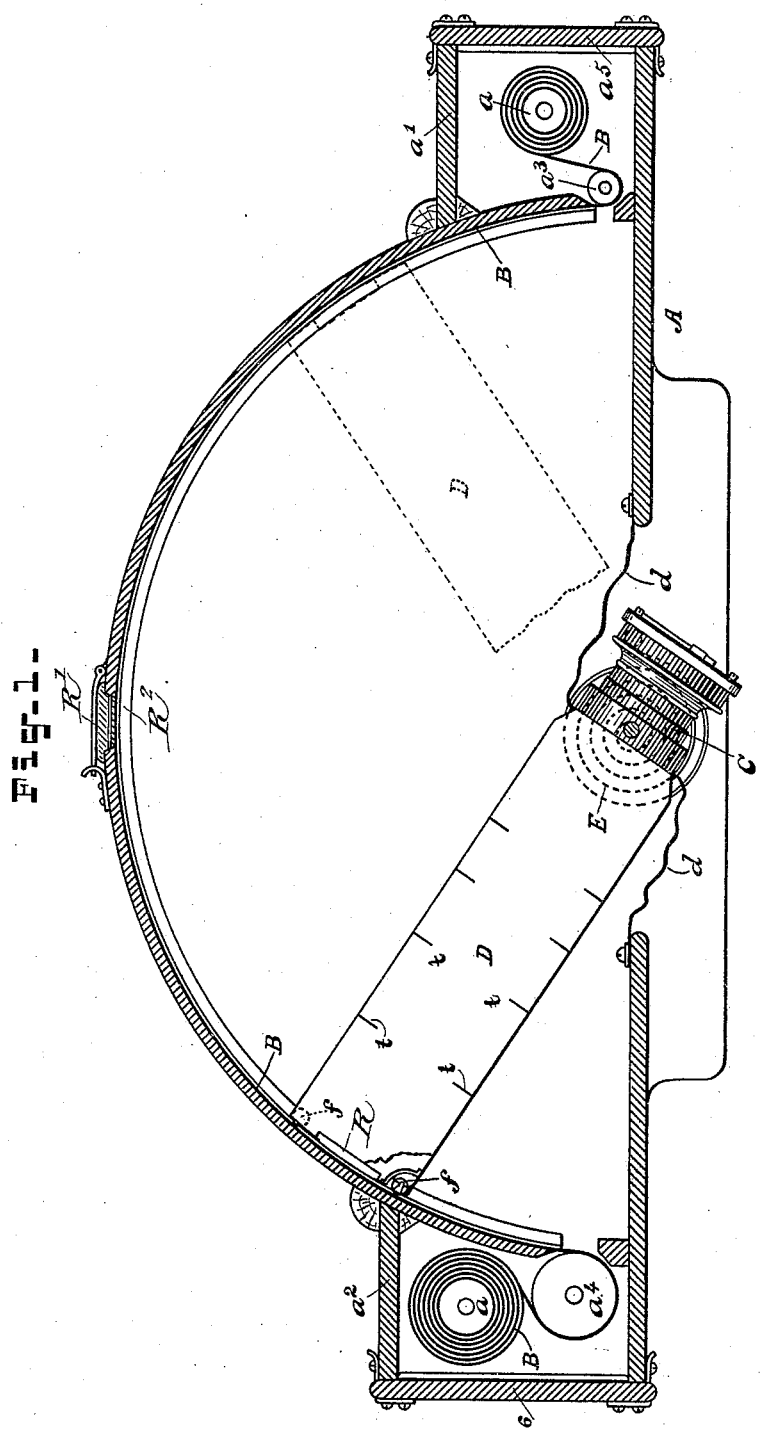

(No Model.) 3 Sheets—Sheet 2.
G. G. ROCKWOOD & H. B. SHALLENBERGER.
PANORAMIC CAMERA.
No. 441,704. Patented Dec. 2, 1890.
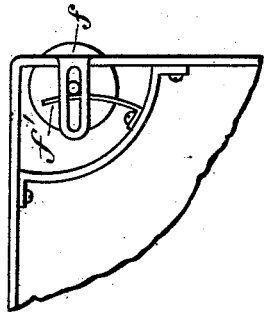
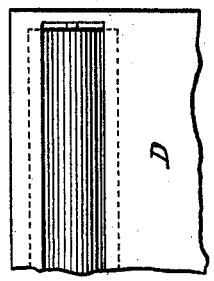
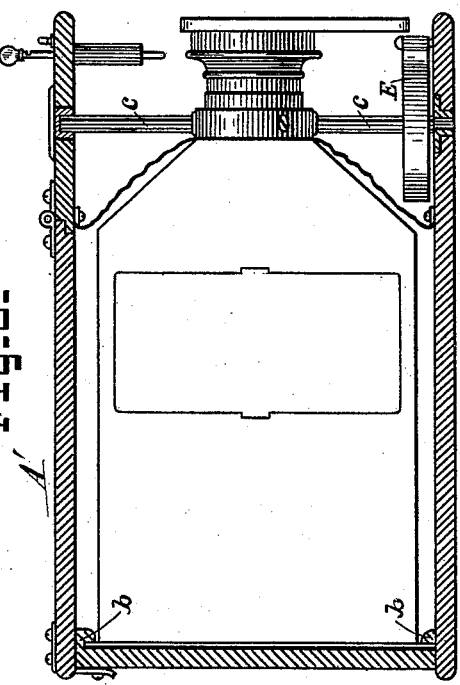

(No Model.) 3 Sheets—Sheet 3.

G. G. ROCKWOOD & H. B. SHALLENBERGER.
PANORAMIC CAMERA.

No. 441,704. Patented Dec. 2, 1890.

Witnesses
L. E. Kirk
J. W. Smith

George G. Rockwood
Herbert B. Shallenberger
Inventors

By their Attorney
Charles A. Terry

UNITED STATES PATENT OFFICE.

GEORGE G. ROCKWOOD, OF NEW YORK, N. Y., AND HERBERT B. SHALLENBERGER, OF ROCHESTER, PENNSYLVANIA.

PANORAMIC CAMERA.

SPECIFICATION forming part of Letters Patent No. 441,704, dated December 2, 1890.

Application filed February 28, 1890. Serial No. 342,180. (No model.)

*To all whom it may concern:*

Be it known that we, GEORGE G. ROCKWOOD, of the city, county, and State of New York, and HERBERT B. SHALLENBERGER, of Rochester, county of Beaver, and State of Pennsylvania, have invented certain new and useful Improvements in Panoramic Cameras, of which the following is a specification.

Our invention relates to a method of and apparatus for photographing extended or panoramic views.

The special object of the invention is to provide means for photographing an extended view by a single operation, as will more clearly appear hereinafter.

The method, stated in general terms, consists in exposing successive portions of a sensitized plate or film to successive portions of the view to be photographed by directing light-rays from the different portions of the view toward successive portions of the plate or film through a lens so moved as to bring successive portions of the plate or film in the path of the light-waves simultaneously with the exposure of that lens to successive portions of the view. The apparatus and method will, however, be particularly described in connection with the accompanying drawings.

In the drawings, Figure 1 is a plan, partly in section, of a camera for carrying the method into operation. Fig. 2 is a side elevation of the same, also partly in section. Figs. 3 and 4 illustrate certain details. Figs. 5, 6, 7, and 8 are enlarged views illustrating the construction of a shutter for use with the camera.

Referring to the figures, A represents a camera box or case, which is semi-cylindrical in form and provided with a lid or cover $A'$. It is constructed with two roll-boxes $a'$ $a^2$, one at each side, for holding a sensitized film upon which the pictures are to be taken. They may be of any desired size, so that any required number of pictures may be taken without recharging the camera.

The general use and operation of roll-holders are now well known, and it will be necessary only to state that any of the usual indicators may be applied for determining when one exposed section of the film has been replaced by a fresh portion. We have shown similar rolls $a\,a$ at the two ends for receiving the film, and two guide-rolls $a^3\,a^4$, over which the film passes. One of these $a^4$ is shown as being of greater size than the other $a^3$. This is a convenient but not a necessary construction. The boxes $a'$ $a^2$ containing the rolls $a$ may have removable ends or sides $a^5\,a^6$.

The film is represented at B. It is caused to pass from one roll to the other along the inner cylindrical surface of the box A, being held in guide-slots $b\,b$. These cause the film to occupy an arc of a circle whose center is at or very near the center of a lens C. The lens is mounted upon a pivot or axis $c$ in such manner that it may be directed toward the different portions of the arc of the film in succession, preserving the focal distance in all positions. The lens C is provided with a box D, constituting in effect an inner camera-box, and this swings or turns with the lens about the pivot $c$.

In operating the apparatus it is designed that the camera-box D be first set in the position indicated by the dotted lines in Fig. 1 and at the proper moment released and allowed to sweep across the entire surface of the film under the influence of a spring E, stopping in the position indicated by the full lines in Fig. 1. It will be observed that during this operation the lens will be directed toward successive portions of the view as the box D uncovers successive portions of the film, and the box D will exclude the light from all other portions of the film.

The end of the box D adjacent to the film may be provided with an opening into which diaphragms or plates R, having slits of different widths, may be inserted to vary the length of the exposure. The length of exposure is of course further determined by the tension of the spring E.

For the purpose of further insuring that the film shall be at the proper distance from the lens when exposed, the box D may be provided with small rolls $f\,f$, one of which is shown on an enlarged scale in Figs. 3 and 4. Springs $f'$ may be employed for pressing the rolls against the film, they being suitably mounted for that purpose, as indicated.

For the purpose of allowing freedom of motion on the part of the lens, the box A may be constructed with a solid front, with the exception of that portion immediately about the lens, and this latter portion may be of flexible cloth or rubber, as indicated at $d\,d$.

For the purpose of examining a view and adjusting the camera, a plate $R^2$ of ground glass may be inserted at the back of the box A, and a lid R' provided for shutting out the light, except when it is desired to use the glass. When this glass is used, it will be necessary to temporarily remove the film in front of it.

Figure 7:
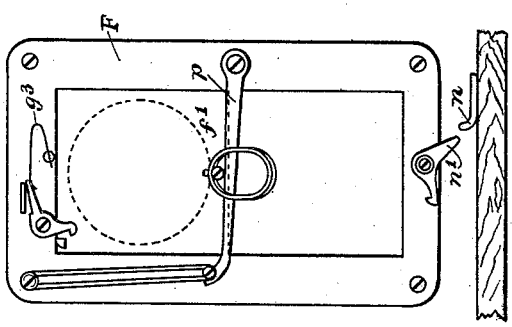
Figure 6:
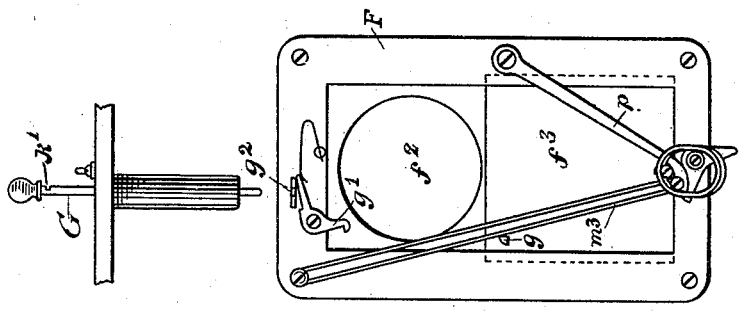
Figure 5:
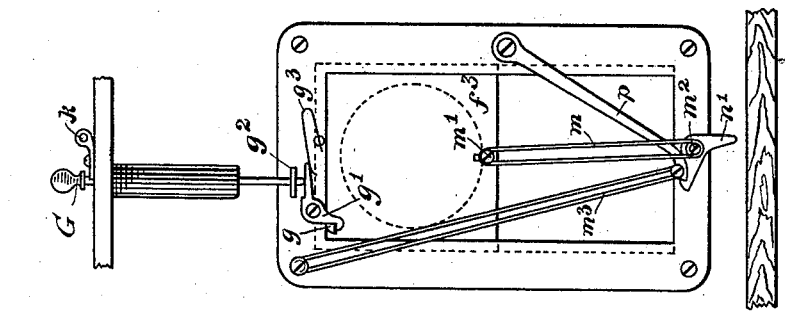

It will be apparent that in order that an even exposure should be given to every part of the film the lens should be uncovered when it starts to move from one limit and that it should be recovered when it reaches the other limit. Various means may be employed for this purpose. That illustrated in Figs. 5, 6, 7, and 8 we have found to serve excellently in practice. This consists of a plate F, having an opening $f^2$ in front of the lens and provided with a slide $f^3$, which is first set in the position shown in Fig. 5 and there held by a detent $g$ and latch $g'$ until the lens is released. The slide is then drawn suddenly downward into the position shown in Fig. 6. The manner of accomplishing this is as follows: The lens-box D, having been turned into the position required to place the spring E under tension, a locking-pin G is dropped through an opening in a plate $g^2$ upon the shutter. The pin strikes the tail of the latch $g'$ and holds it in engagement with its detent $g$ against the tension of a spring $g^3$. A latch $k$ engages the pin G by entering a slot $k'$ and thus holds the pin down. An elastic band or spring $m$ is stretched from a stud $m'$ upon the slide $f^3$ to a stud $m^2$ at the lower end of the shutter-frame. When now the latch $k$ is caused to release the pin G, the camera-box D and lens C are released and respond to the pressure of the spring E, and at the same time the slide $f^3$ is released and responds to the elastic band $m$. The band $m$, as its tension is removed, releases itself from the stud $m^2$. The lens is thus uncovered, as shown in Fig. 6, and the camera-box D moves through its arc. When it reaches its limit of motion, a stop $n$ upon the frame of the box A trips a latch $n'$ at the bottom of the shutter-frame, and this releases a lever $p$, which passes beneath the stud $m'$ or some other suitable portion of the slide. A band or spring $m^3$ immediately tends to draw the lever $p$ upward, and this restores the slide to its former position, as indicated in Fig. 7. The trip $n$ may be placed in such position that the slide will be released immediately before the lens is brought to rest, if desired, to insure that the exposure at the end of the arc shall not be longer than at other portions.

It is evident that very many other different forms of shutters may be employed and other portions of the apparatus may be considerably modified without departing from the spirit of the invention.

For the purpose of preventing any rays of light from being reflected from the sides of the diaphragm-box D, walls $t\ t$ may project inward. These serve to cut off any rays which might otherwise tend to fog the image.

We claim as our invention—

1. In a panoramic camera, the combination of a roll-holder, guides for guiding a flexible film from one roll to the other through a cylindrical plane, a lens pivoted in the axial line of the cylinder for directing light-rays against different portions of the cylindrical plane in succession, a shutter for exposing and covering the lens, a releasing device for automatically opening the shutter at one limit of the movement of the lens, and a tripping device automatically closing the same at the other limit of the movement of the lens.

2. The combination, with the pivoted lens, of a panoramic camera, a stationary curved back plate, and an automatically-operating shutter exposing the lens at one limit of its movement and concealing it at the other limit, substantially as described.

3. In a panoramic camera, the combination of a stationary camera-box having a semi-cylindrical back, a revolving camera-box pivoted in the axial line, and the stationary box and rollers at the end of the pivoted box pressing toward the back, substantially as and for the purpose set forth.

4. In a panoramic camera, the combination of a stationary camera-box having a curved back, a completely-closed pivoted inner camera-box, a lens at one end of the pivoted box, and light-intercepting walls projecting inward from the walls of the inner pivoted box, substantially as described.

5. In a panoramic camera, the combination of a stationary camera-box having a semi-cylindrical back and an inner lens-carrying box pivoted in the axial line of the semi-cylindrical back, and having side walls extending from the lens to the back and top and bottom walls, closing the space between the side walls, and contacts moving with the inner box for holding the film at any time exposed to the lens at the end of the box against the back, substantially as described.

6. In a panoramic camera, the combination of a stationary camera-box having an opaque curved back for receiving the film, and a plate of ground glass inserted in said back.

7. In a panoramic camera, the combination of a stationary camera-box having a curved back, a plate of ground glass inserted therein for use in adjusting the camera, and an opaque cover for the same.

In testimony whereof we have hereunto subscribed our names this 15th day of February, A. D. 1890.

GEO. G. ROCKWOOD.
HERBERT B. SHALLENBERGER.

Witnesses to the signature of Geo. G. Rockwood:
WALTER F. DEXTER,
ADOLPH W. FRANKE.

Witnesses to the signature of Herbert B. Shallenberger:
A. SAUNDERS MORRIS,
O. B. SHALLENBERGER.